W. D. & F. G. BOWMAN.
TIME CHECK APPARATUS.
APPLICATION FILED DEC. 18, 1909.

1,015,287.

Patented Jan. 23, 1912.
8 SHEETS—SHEET 1.

WITNESSES:

INVENTORS:
WILLIAM DAVID BOWMAN
AND
FREDERICK GEORGE BOWMAN
by H. van Oldenneel
Attorney.

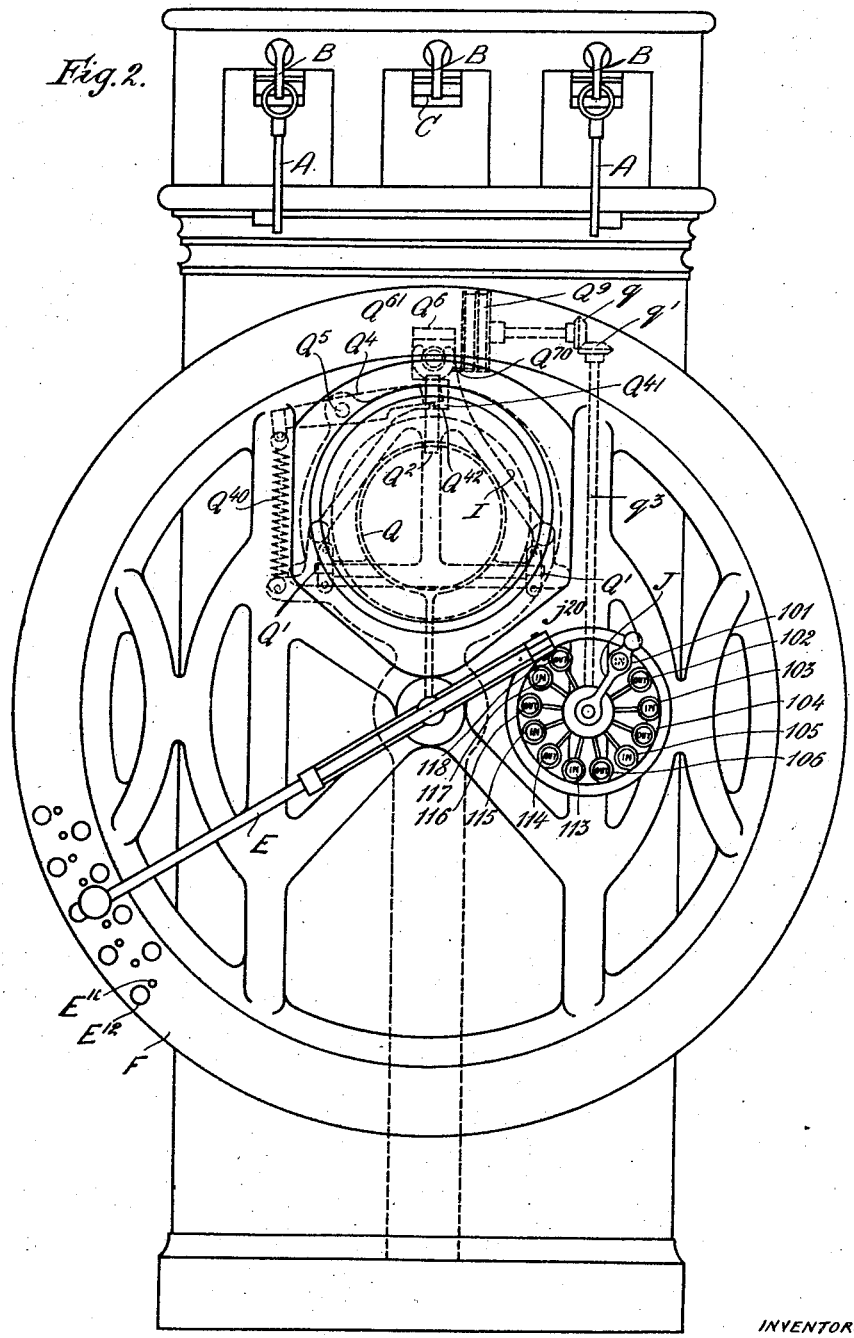

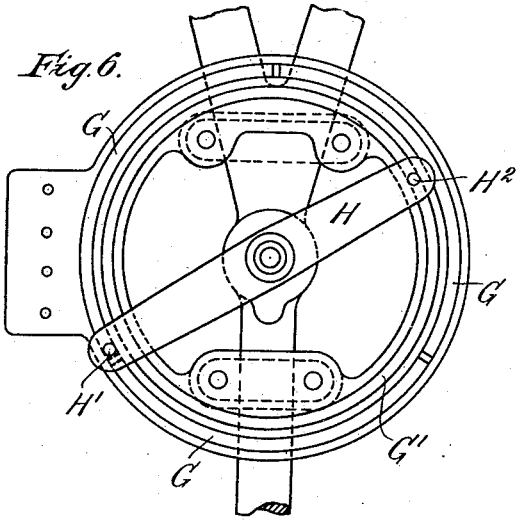
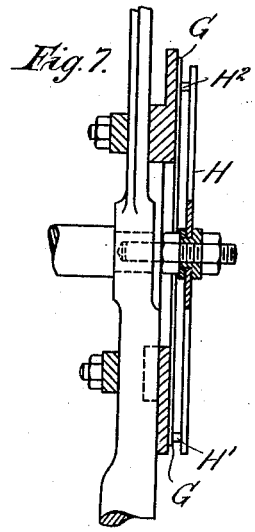
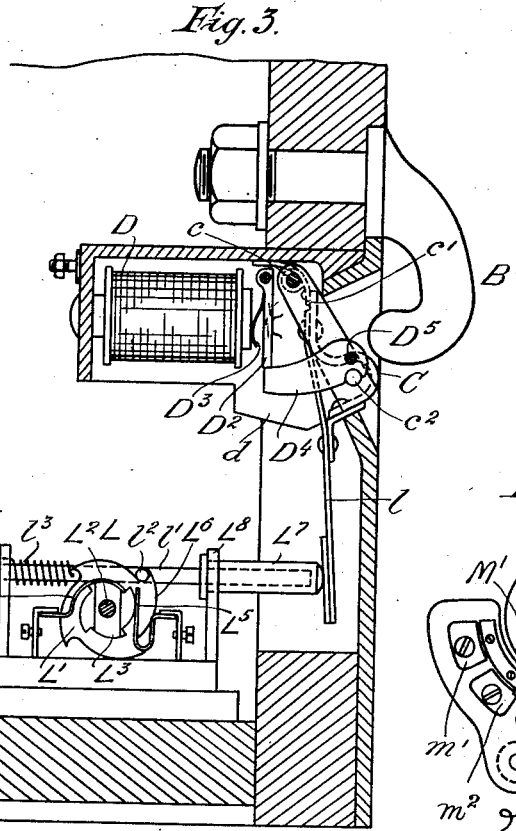
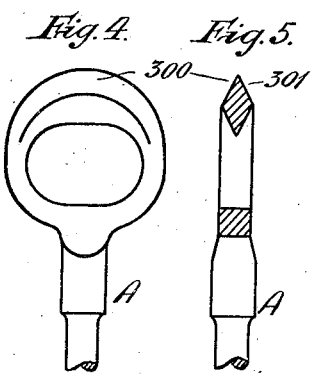
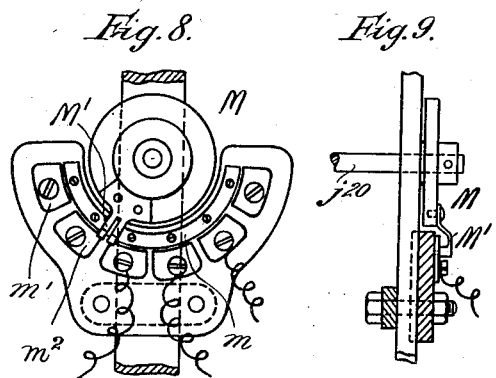

W. D. & F. G. BOWMAN.
TIME CHECK APPARATUS.
APPLICATION FILED DEC. 18, 1909.

1,015,287.

Patented Jan. 23, 1912.

8 SHEETS—SHEET 4.

WITNESSES:

INVENTORS:
WILLIAM DAVID BOWMAN
AND
FREDERICK GEORGE BOWMAN
by
Attorney.

W. D. & F. G. BOWMAN.
TIME CHECK APPARATUS.
APPLICATION FILED DEC. 18, 1909.

1,015,287.

Patented Jan. 23, 1912.
8 SHEETS—SHEET 5.

WITNESSES:
John H. Hoving.
H. M. Kilpatrick.

INVENTORS:
WILLIAM DAVID BOWMAN
AND
FREDERICK GEORGE BOWMAN
by H. van Oldennul
Attorney

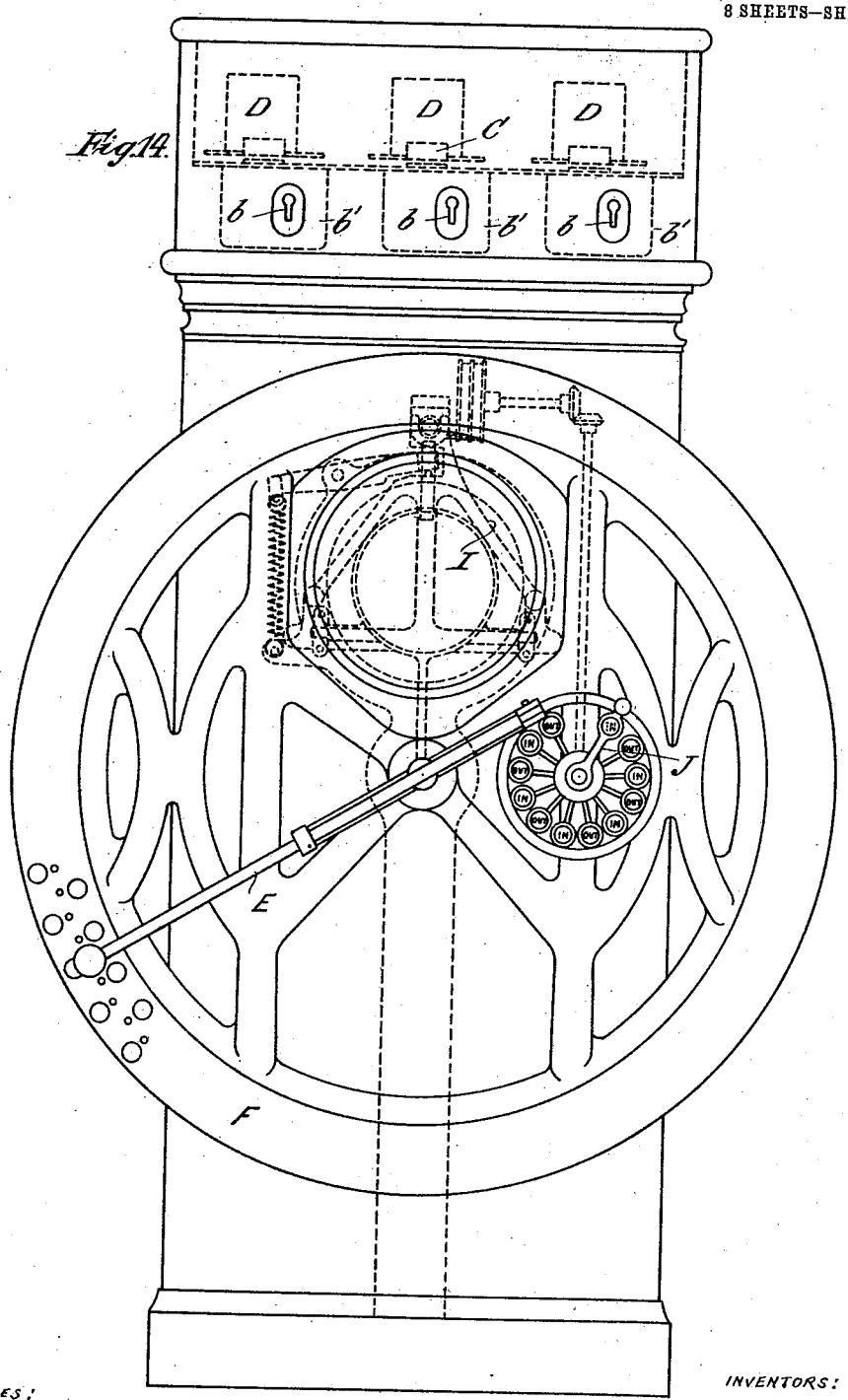

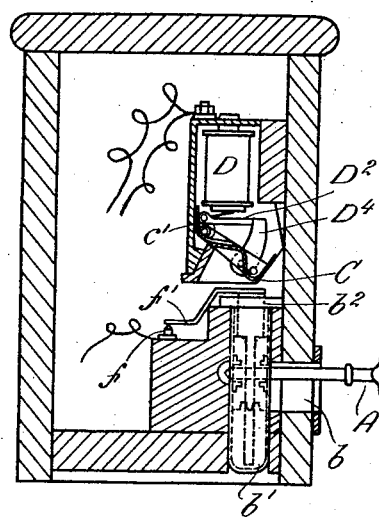
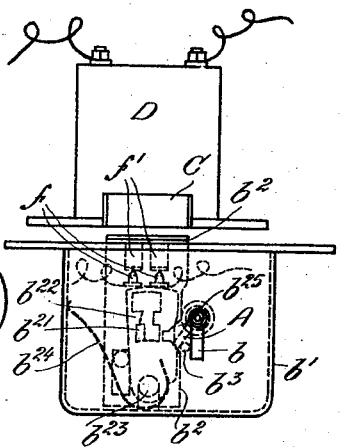
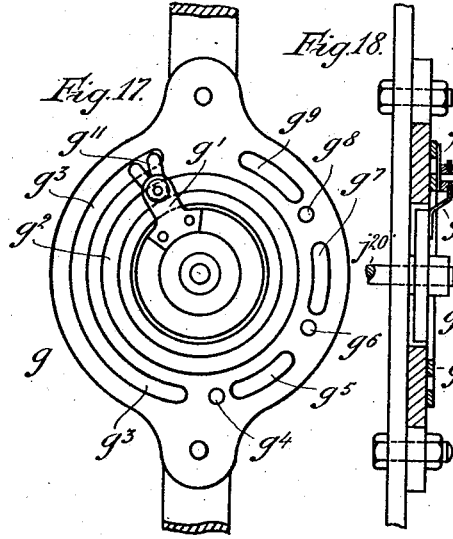
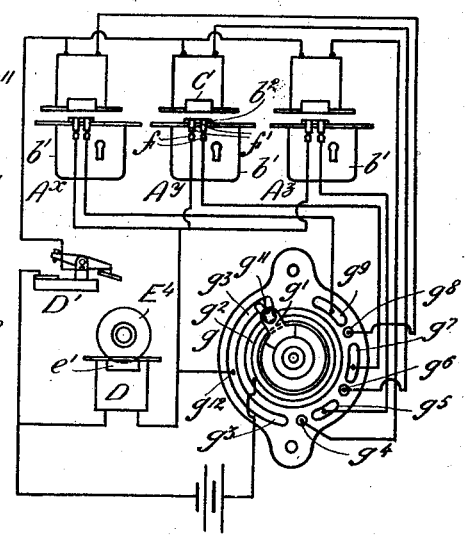

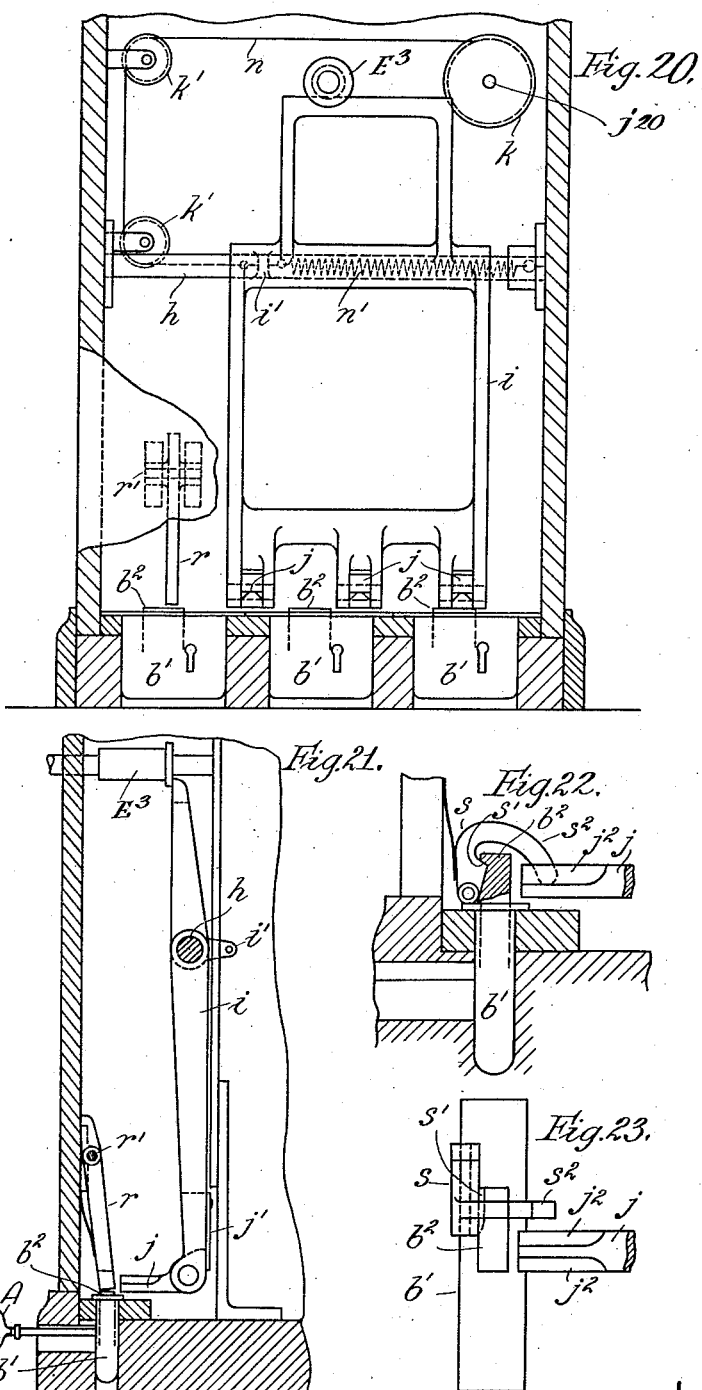

UNITED STATES PATENT OFFICE.

WILLIAM DAVID BOWMAN AND FREDERICK GEORGE BOWMAN, OF GLASGOW, SCOTLAND.

TIME-CHECK APPARATUS.

1,015,287.   Specification of Letters Patent.   Patented Jan. 23, 1912.

Application filed December 18, 1909. Serial No. 533,935.

*To all whom it may concern:*

Be it known that we, WILLIAM DAVID BOWMAN and FREDERICK GEORGE BOWMAN, subjects of the King of the United Kingdom of Great Britain and Ireland, and residing at Glasgow, Scotland, have invented a certain new and useful Improvement in Time-Check Apparatus, of which the following is a specification.

This invention relates to workmen's time check apparatus of the kind adapted to record the time spent by workmen during working hours in special occupations, as for example in the use of water closets.

The object of the present invention is to provide in such apparatus auxiliary devices which serve to retain and release a removable article or articles—e. g. a key or keys for opening the doors giving access to such places of resort.

Figure 1:
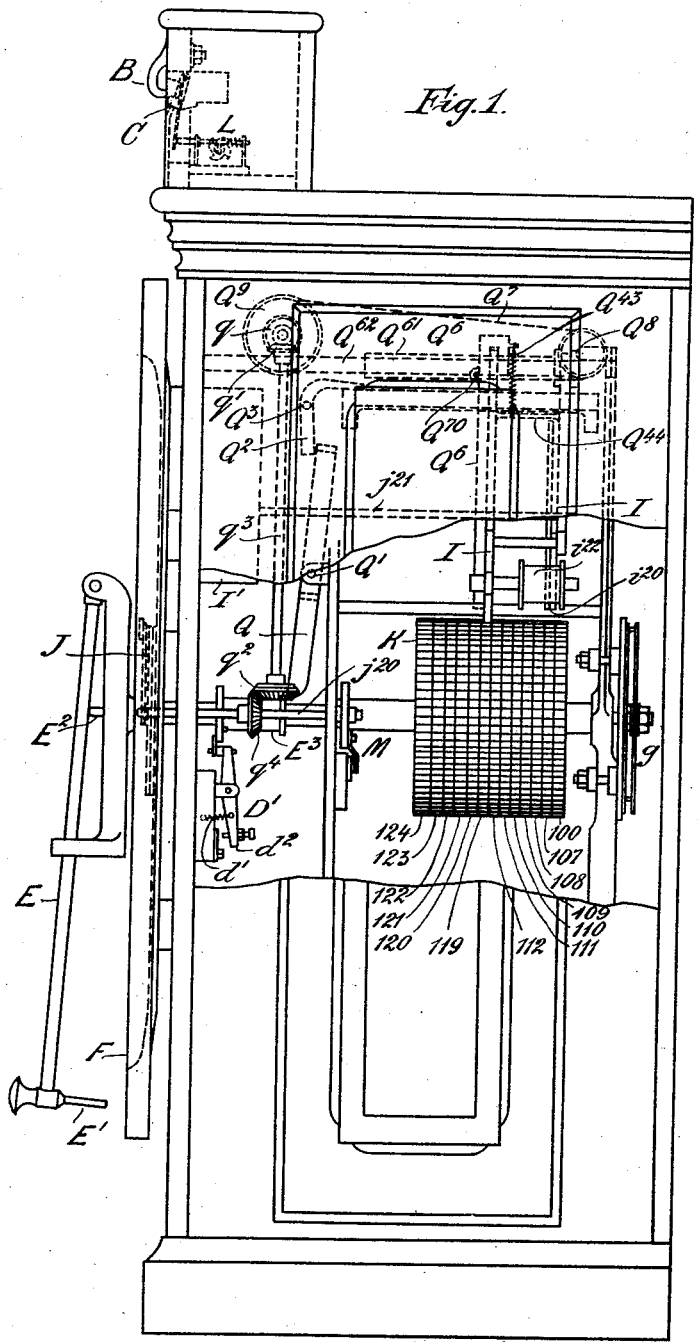
Figure 11:
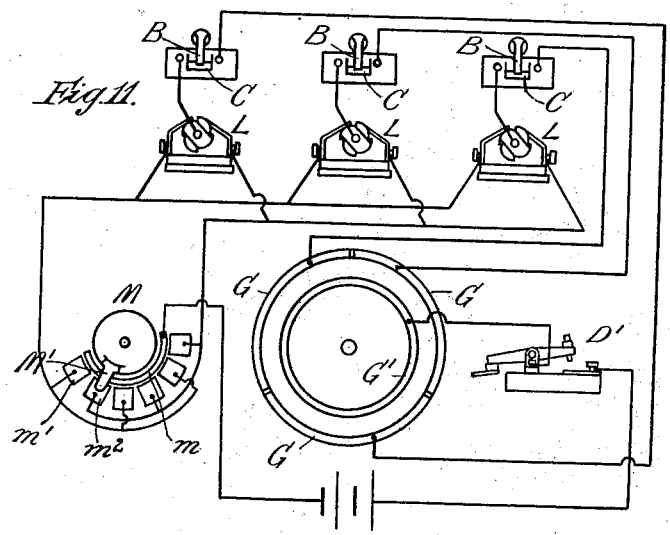
Figure 10:
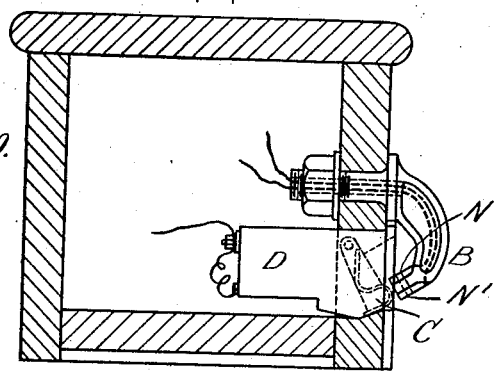
Figure 12:
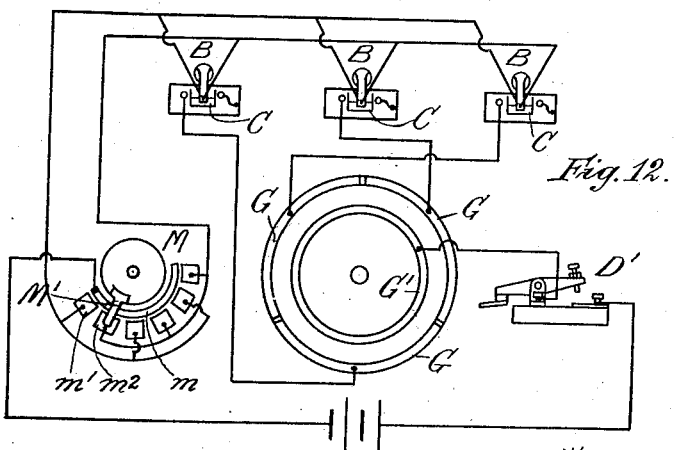
Figure 13:
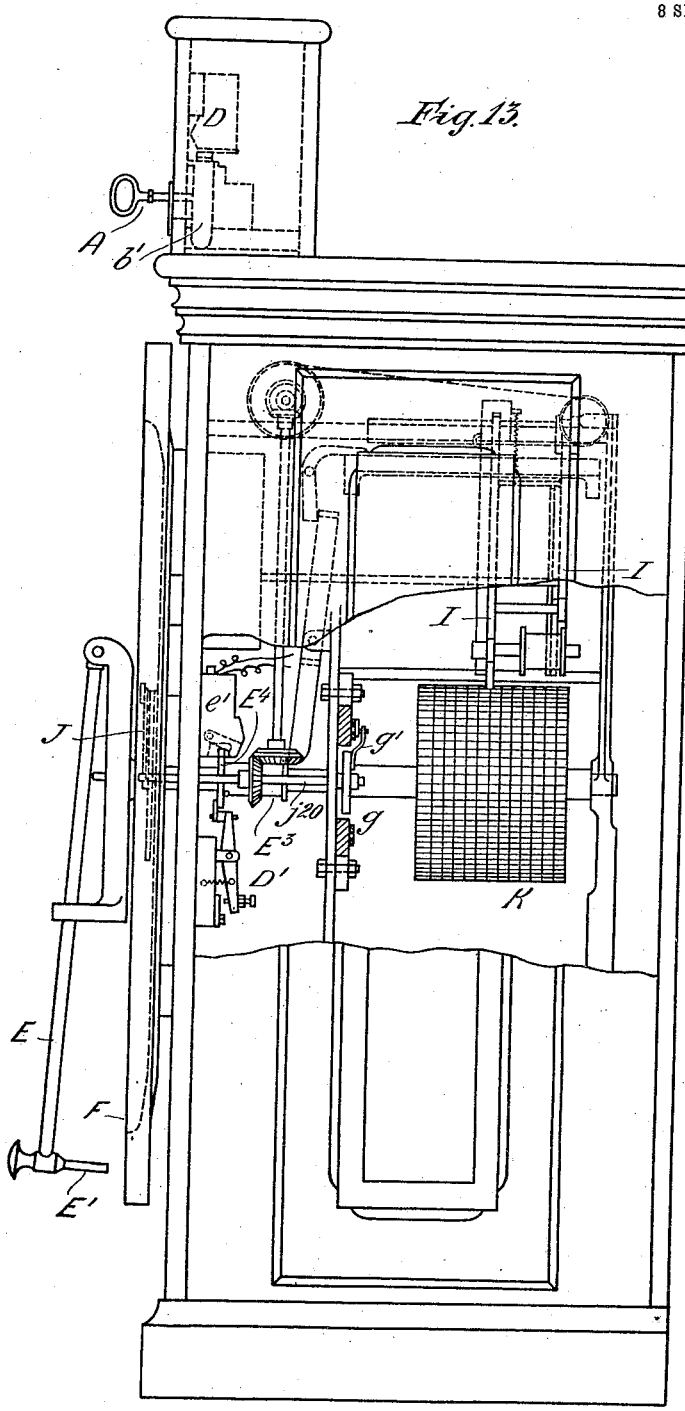

In the accompanying drawings Figure 1 is a side elevation (partly broken away to expose the mechanism) and Fig. 2 is a front elevation showing by way of example time check apparatus of well-known type fitted with our improvements; Fig. 3 is a vertical section showing one form of locking catch and connections; Figs. 4 and 5 are detail views of one of the keys which may be employed; Figs. 6 to 9 are detail views of electric switches hereinafter referred to; Fig. 10 shows a modified construction of catch device; Figs. 11 and 12 show diagrammatically the electrical connections of the apparatus illustrated in Figs. 1 to 9, and in Fig. 10, respectively; Figs. 13 and 14 are like views to Figs. 1 and 2, and Figs. 15 to 19 are detail views thereof, showing a modification; Figs. 20 to 23 show details of further modifications.

Like reference characters denote similar parts in the several views of the drawings.

Referring to the drawings, each of the keys referred to is hung upon a closed hook-like device (see Figs. 1, 2 and 3) including a stationary member B and a movable catch C pivoted at $c$ which catch allows the key A (which may be tapered as at 300 and 301, Figs. 4 and 5) to be withdrawn, and on closing up, after insertion of the key, serves to hold it locked against unauthorized use. The catches of such hook devices may be of well known kind as used for other purposes and having a locking bolt actuated by an electro-magnet. In its adaptation to the present purpose the catch is unlocked and locked on the making and breaking of the electric circuit through the coils of the electro-magnet D by means of a switch $D^1$ operated by the workman depressing an arm E which carries a pointer $E^1$ adapted to pass through a perforation $E^{11}$ opposite his number in a space $E^{12}$ on the dial F of the time checking apparatus, said arm E engaging with a spindle $E^2$ which is adapted to move inward from its normal position indicated in Fig. 1 a sleeve $E^3$ and thus permit a spring $d^1$ to operate a pivoted lever $d^2$ which closes the circuit through said switch and said electro-magnet.

The inward movement of the sleeve $E^3$ is utilized to impart movement to the usual lever Q which is pivoted at $Q^1$ and is adapted, by means of a trip-lever $Q^2$ pivoted at $Q^3$ and a lever $Q^4$ pivoted at $Q^5$ (Fig. 2) to impart downward movement to the usual type carriage I, against the action of a spring $Q^{40}$ said carriage being notched or recessed, as at $Q^{41}$, Fig. 2, for engagement with the lever $Q^4$ and being provided with a projection $Q^{42}$ held in contact with said lever by means of a spring $Q^{43}$ (Fig. 1) attached to a cross bar $Q^{44}$ on the type carriage and to a longitudinally movable frame $Q^6$ on which said carriage slides vertically and with which said carriage moves longitudinally, the said frame $Q^6$ including a guiding sleeve $Q^{61}$ supported on a stationary shaft $Q^{62}$.

The type carriage I has mounted on it type wheels $i^{20}$ adapted to be operated by means of a shaft $i^{21}$ flexibly connected to the clock $I^1$. The said carriage also carries an inked ribbon $i^{22}$ which is interposed between the said type wheels and the recording drum K.

The frame $Q^6$ and the type carriage I are adapted to be moved longitudinally by means of a traveling band $Q^7$ connected to said frame $Q^6$, as at $Q^{70}$, and passing around pulleys $Q^8$, $Q^9$, said pulley $Q^9$ having secured to its rotatable spindle a bevel gear wheel $q$ to which gear wheel $q$ movement is imparted, and thereby to the traveling band $Q^7$ and frame $Q^6$ by means of bevel gear wheels $q^1$, $q^2$ on a vertical spindle $q^3$ and a bevel gear wheel $q^4$ on a spindle $j^{20}$ to which the usual manually operated lever J is secured. The said lever J is thus adapted to move endwise, the type carriage I and its frame $Q^6$ relatively to the drum K which carries the time record sheet, in order that the interval during which the key is absent from its lock, and the time when a workman enters or leaves the workshop, may be properly recorded, said lever J being rotatable over a selector dial having divisions which bear alternately the words "In" and "Out," while the drum K is adapted to be rotated by the workman on rotating the pointer arm E to bring the pointer $E^1$ opposite his number and thus also bring the space corresponding to his number on the sheet on the recording drum beneath the type wheels of the type carriage.

As shown, the divisions 101, 102, 103, 104, 105 and 106 correspond, respectively, to the vertical columns 107, 108, 109, 110, 111 and 112 on the time record sheet, the column 100 containing the workmen's numbers, while the divisions 113, 114, 115, 116, 117 and 118 corresponding, respectively, to the vertical columns 119, 120, 121, 122, 123 and 124. Horizontal lines divide the vertical columns so as to provide spaces opposite the workmen's numbers. The time of entering the workshop in the morning is recorded in column 107 in the space opposite the workman's number, and the time of leaving the workshop say for breakfast is recorded in column 108, while the time of entering the workshop after breakfast is recorded in column 109. The time of leaving the workshop say for dinner is recorded in column 110, and the time of entering the workshop after dinner is recorded in column 111, while the time of ceasing work for the day is recorded in column 112. An interval, during which one of the said keys is permitted to be used by a workman, is allowed between commencing work in the morning and breakfast time, and another interval is allowed between breakfast time and dinner time, while a further interval is allowed between dinner time and ceasing work for the day.

The time at which a key is withdrawn and replaced during the first mentioned interval is recorded in columns 120 and 119, respectively, in a space opposite the workman's number, and the time at which a key is withdrawn and replaced during the second mentioned interval is recorded in columns 122 and 121, respectively, while the time at which a key is withdrawn and replaced during the third mentioned interval is recorded in columns 124 and 123, respectively.

By preference a number of keys are provided, each key being secured on a closed hook or catch and each catch C which coöperates therewith, being in an independent electric circuit. If three keys are provided, as shown, the number dial F is divided into three sections, one key being provided for each section, which section includes a plurality of workmen's numbers; and three stationary insulated strips G (Figs. 1, 6, 7 and 11) are suitably spaced to correspond and provide contacts for the individual circuits, (Fig. 11) in conjunction with a stationary insulated ring $G^1$, in circuit with the switch $D^1$, and a bar H which is fitted on the arbor of the drum K and has projections $H^1$, $H^2$, adapted to engage with said strips G and said ring $G^1$, respectively.

The electro-magnet D operates in conjunction with a pivoted flap $D^2$ adapted to be withdrawn, against the action of a flat spring $D^3$, from engagement with the inner end of an arm $D^4$ which is freely pivoted at $D^5$ on the side of the casing $d$ and is formed with a recess engaged by a pin $c^2$ on said catch, which pin causes the said arm to turn upward on its pivot $D^5$ clear of the flap $D^2$, whereupon the pivoted catch C is permitted to be moved inwardly against the action of a spring $c^1$. A workman whose number is on say the first section can only release the key provided for that section by pressing the pointer $E^1$ through the perforation in the dial opposite his number, thus closing the circuit through the electro-magnet D, whereupon the pivoted flap $D^2$ is withdrawn from engagement with the arm $D^4$ and the catch C is unlocked so that it can be pressed back to permit the key to be withdrawn. When the key has been withdrawn, the catch C is closed by means of its spring $c^1$, and the flap $D^2$ engages again with the arm $D^4$, so that on return of the key after use the catch C can only be reopened by depressing the pointer arm E to again make the electric circuit through the electro-magnet D.

To further insure that the time shall be recorded in the proper column on the time record sheet by the workman when going out or coming in, starting or finishing, a switch L (Figs. 3 and 11) of well known construction is operated by an extension $l$ on the movable part C of the hook-like catch or locking bolt, which switch makes and breaks alternately two electric circuits (see Fig. 11) one of which enables the catch C to be opened for the release of the key and the other enables the catch to be opened for the return of the key.

As shown in Figs. 3 and 11, the switch L comprises a rotatable member $L^1$ of suitable insulating material mounted on a metallic spindle $L^2$ and having a contact piece $L^3$ which is adapted to engage alternately with contacts $L^4$, $L^5$ in said circuits, said spindle $L^2$ and contact piece $L^3$ being in circuit with the electro-magnet D. The member $L^1$ has secured to it a ratchet-toothed wheel $L^6$ adapted to be engaged by a pin $l^2$ on a rod $l^1$ which is surrounded by a spring $l^3$ one end of which is connected to a support $l^5$ freely entered by one end of said rods, while the other end of said spring is secured to the rod $l^1$ the other end of which is freely mounted in a sleeve $L^7$ which is carried on a support $L^8$ and is adapted to be engaged by said extension $l$. A suitable switch M (Figs. 1, 8, 9 and 11) having an arm $M^1$ adapted to engage with contacts $m$, $m^1$ and $m^2$ is also operated by the handle or lever J for moving endwise the type carriage I, which switch M is also adapted to make and break the said two electric circuits as by means of the arm $M^1$ engaging with the contacts $m$, $m^1$, or $m$, $m^2$. It is therefore necessary for one of these electric circuits to be closed by both switches L and M before the key can be released.

The act of releasing or withdrawing the key imparts movement to the catch C and this movement is communicated by means of the extension $l$ to the push rod $l^1$, whereby the pin $l^2$, on riding on the outer curved face of the upper tooth of the wheel $L^6$ is raised, and thus rotates the rod $l^1$ against the action of the spring $l^3$, and compress said spring until clear of the ratchet tooth whereupon the spring $l^3$ returns the rod $l^1$ to normal position, Fig. 3, the pin $l^2$ engaging one of the ratchet teeth and causing said wheel $l^6$ and member $L^1$ and contact piece $L^3$ to rotate whereby one of said circuits is broken and the other is closed, which last mentioned circuit must also be closed by the arm $M^1$ of the switch M (Fig. 11) engaging with the corresponding contacts of said switch before the key can be returned to the catch. As each key is in the usual course, alternately released and returned, the handle or lever J moving the type carriage endwise and also operating one of the switches must also be moved alternately from the one position to the other. Alternately, the said switch L is dispensed with, and the stationary portion of the hook-like catch has two contact portions N, $N^1$, (Fig. 10) with insulating material between them. The portion N forms part of an electric circuit (see Fig. 12) and is arranged so that when the key A is in the act of being released it will be caused to make contact with the portion N and with the movable catch part C controlled by the electro-magnet D which part C is also placed in said circuit, said circuit being closed by means of the arm $M^1$ of the said switch M bridging for example the contacts $m$, $m^1$ (see Fig. 12), thus enabling the key A to be withdrawn. Another electric circuit (Fig. 12) is adapted to be closed, when the key is in the act of being returned, by means of the key making contact with said portion $N^1$ and the movable catch part C, the arm $M^1$ of the switch M then bridging the contacts $m$, $m^2$ (Fig. 12) whereby the key may be returned to the locking device. In other respects the arrangement of devices is similar to that described with reference to Figs. 1 to 9.

The construction shown in Figs. 13 to 19 is substantially the same as that shown particularly in Figs. 1, 2 and 3 except that each of the keys A (Figs. 13 and 15) or the like is passed through an opening $b$ in a lock $b^1$ which, as shown particularly in Fig. 16, include a suitably guided bolt $b^2$ having a projection $b^{21}$ adapted to engage a slotted and notched lever $b^{22}$, which is pivoted at $b^{23}$ and has secured to it a spring $b^{24}$, said lever $b^{22}$ serving to maintain the bolt $b^2$ in position when projected and retracted. The movable bolt $b^2$ which is recessed, as at $b^{25}$, for the reception of the key, is arranged to project from the lock when the key A is removed but is adapted to be retracted when said key is returned to the lock and turned or moved into the unlocking position of the key indicated in Fig. 16. A pin or stop device $b^3$ secured to the case of the lock $b^1$ serves to limit the movement of the key A which, on account of its engagement with the recess $b^{25}$ in the bolt $b^2$, see Fig. 16, cannot be removed until it has been turned in an opposite direction so as to project the bolt $b^2$ again.

A pivoted catch C, similar in construction to that hereinbefore described with reference to Fig. 3, is arranged adjacent to the bolt $b^2$ of the lock $b^1$ and is adapted to coöperate therewith so that when the bolt $b^2$ is being projected to permit the key A to be removed it engages with the pivoted catch C and presses it inwardly against the action of spring $c^1$, but when the pivoted catch C is prevented from moving inwardly by means of the pivoted flap $D^2$ and relative parts hereinbefore described said catch prevents the bolt $b^2$ from being projected and thereby prevents the key A from being rotated and withdrawn from the lock $b^1$.

By preference, a number of keys are provided, each key being secured in a lock, and each catch C which coöperates therewith being in an independent electric circuit. The said circuits are controlled by a switch $g$ (Figs. 13, 17, 18 and 19) common to all, said switch including a lever $g^1$ preferably fixed to the spindle $j^{20}$ which is rotated by means of the lever J adapted to move the type carriage I relatively to the drum K, as hereinbefore described with reference to Figs. 1 and 2.

A workman can only release a key by pressing the pointer $E^1$ on the arm E through the perforation opposite his number on the dial F and closing the circuit through the switch $D^1$ and the electro-magnet D in the manner above described whereupon the pivoted flap $D^2$ is withdrawn from engagement with the arm $D^4$ and the catch C is unlocked so that it can be pressed back by the bolt $b^2$ and thus permit the key to be withdrawn from its corresponding lock $b^1$. When the key has been withdrawn, the catch C remains unlocked until the return of the key, after use, the catch C being only reopened to permit again the removal of the key, by depressing the pointer arm E to make the electric circuit through the electro-magnet D in the manner above described.

As a means of insuring that a key shall be returned by a workman to its corresponding lock, and secured therein, prior to the time recording devices being actuated to record the return of said key, there is employed a retaining catch $e^1$ (preferably similar in construction to the said catch C), said catch being located (see Figs. 13 and 19) so as to intercept the path of movement of a collar $E^4$ or the like on the said sleeve $E^3$. This catch $e^1$, however, is in circuit with contacts $f$ (Figs. 15, 16 and 19) which, when the key has been returned to its lock, are engaged by a corresponding contact or contacts $f^1$ on the bolt $b^2$ of the lock, whereupon the said circuit is closed and the catch $e^1$ is unlocked to permit the recording devices being actuated, the lever J being then operated by the workman, in the manner hereinbefore described with reference to Figs. 1 and 2, to move the type carriage I to such a position as will insure a record being made in the proper column of the recording sheet and in a space opposite his number.

As shown in Figs. 13, 17, 18 and 19, the said switch $g$ comprises an inner insulated ring $g^2$ and outer insulated contacts $g^3$, $g^4$, $g^5$, $g^6$, $g^7$, $g^8$ and $g^9$ disposed concentrically with the ring $g^2$, the said switch lever $g^1$ being adapted to bridge the ring $g^2$ and said contacts by means of its outer insulated member $g^{11}$ which is preferably of the form shown in Fig. 17, in order to insure positive engagement of said member with two adjoining contact pieces, such as $g^4$ and $g^5$, and with the ring $g^2$ simultaneously. Thus, while one key $a$ may be absent from its locking device, for example, from the locking device at $A^x$ (Fig. 19) which is in circuit with the ring $g^2$ and the contact pieces $g^8$ and $g^9$, the movement of the means for actuating the time recording devices will be prevented by the catch $e^1$, the said switch lever $g^1$ may then be operated to make another electric circuit, for example, through the ring $g^2$ and the contact pieces $g^6$, $g^7$, corresponding to the locking device at $A^y$ (Fig. 19) whereupon the key corresponding to said lock at $A^y$ may then be withdrawn and cause its bolt $b^2$ to break the electric circuit in connection with the catch $e^1$, which catch will then prevent movement of the means for actuating the time recording devices until the last mentioned key is also returned to its corresponding lock or until the switch lever $g^1$ has been operated to bridge, for example, the ring $g^2$ and the contacts $g^4$, $g^5$ corresponding to the lock at $A^z$ (Fig. 19). The switch lever $g^1$ may also control directly, as from $g^{12}$, an electric circuit in connection with the catch $e^1$, the switch lever $g^1$ then bridging the ring $g^2$ and the contact strip $g^3$, so that ordinary time records, independent of the time records for any of the keys, may be made.

Alternatively, mechanical devices may be employed to control the operation of the key locking devices and of the means which actuate the recording devices. As shown in Figs. 20 to 23, the mechanical devices may comprise a shaft $h$ carrying a frame $i$ adapted to be rocked on movement of the sleeve $E^3$ for imparting movement to the means which actuate the time recording devices hereinbefore described, said frame $i$ carrying freely mounted spring-controlled lever arms $j$, one for each lock $b^1$ suitably spaced apart and adapted to be moved simultaneously so that only one lever arm $j$ at a time is opposite its corresponding lock $b^1$, said movement being imparted, as by means of the spindle $j^{20}$ to which the lever J hereinbefore referred to is attached, said spindle $j^{20}$ being adapted to rotate a pulley $k$ around which pulley and pulleys $k^1$ a cord $n$ or the like is passed and connected to a lug $i^1$ on said frame which is moved against the action of a spring $n^1$ one end of which is secured to said lug $i^1$ and the other end of which is secured, as at $i^{11}$, to a stationary part of the apparatus. The arrangement is such that when the key A of a corresponding lock $b^1$ is in engagement therewith, it is prevented from being removed by a spring-actuated stop-piece $r$, one for each lock, each of which stop-pieces may be pivoted, as at $r^1$, so that its lower end is adapted to extend over the top of its corresponding lock and so prevents outward movement of the bolt $b^2$ thereof until the recording devices hereinbefore referred to have been actuated, whereupon the frame $i$ is rocked on the shaft $h$ and one of the arms $j$ moves the lower end of its corresponding stop-piece $r$ clear of its corresponding bolt $b^2$ which can then be projected and permit the key A to be removed, the outward movement of the bolt $b^2$ being utilized to raise the corresponding lever arm $j$ against the power of its spring $j^1$, whereby the bolt $b^2$ is interposed between the stop-piece $r$ and its corresponding lever arm $j$, and movement of the said sleeve $E^3$ is prevented, but is permitted when the corresponding key has been returned to its lock and the bolt retracted.

A device may be provided to act in conjunction with the bolt $b^2$ of the lock, when it is projected, so as to prevent said bolt from being retracted except when the corresponding lever arm $j$ is in a definite position relative to its lock. As shown in Figs. 22 and 23, the said device may comprise a pivoted spring-actuated member *s* having a projection $s^1$ adapted to engage a notch in the bolt $b^2$, said member being also provided with an extension $s^2$ adapted to be actuated by beveled edges $j^2$ on the corresponding arm *j*, when said arm is moved endwise, so as to disengage the projection $s^1$ from the notch in the corresponding bolt. This arrangement is desirable as it insures that the said type carriage I, which is operated by the lever J on the shaft $j^{20}$ as hereinbefore described, will be moved endwise into proper position, relative to the recording drum, before the bolt of the corresponding lock can be retracted.

Having now described our invention what we claim and desire to secure by Letters Patent of the United States is:—

1. The combination with time check apparatus, said apparatus including a clock, marking devices for marking the times given by the clock, connections between the clock and the marking devices, imprint taking mechanism, and controlling mechanism for controlling the position of the imprint produced by said marking devices, of coöperating parts adapted to be locked together and unlocked, the locking and unlocking of which are controlled by said controlling mechanism, said controlling mechanism being so constructed and arranged in relation to said marking devices and to said coöperating parts that the marking and unlocking operations controlled thereby shall be consequent one on the other.

2. The combination with a clock, of marking devices in gear with the clock, imprint taking mechanism, controlling mechanism for controlling the position of the imprint produced by said marking devices, a number of sets of coöperating parts adapted to be locked together and unlocked the locking and unlocking of which are controlled by said controlling mechanism, said controlling mechanism being so constructed and arranged in relation to said marking devices and said coöperating parts that the marking and unlocking operations controlled thereby shall be consequent one on the other, and a selector coöperating with the controlling mechanism and the marking devices.

In testimony whereof we have signed our names to this specification in the presence of two subscribing witnesses.

WILLIAM DAVID BOWMAN.
FREDERICK GEORGE BOWMAN.

Witnesses:
WALLACE FAIRWEATHER,
JOHN McCLEARY, Jr.

Copies of this patent may be obtained for five cents each, by addressing the "Commissioner of Patents, Washington, D. C."